United States Patent
Balasubramanian et al.

(10) Patent No.: US 11,764,664 B2
(45) Date of Patent: Sep. 19, 2023

(54) METHODS AND APPARATUS FOR PROTECTING STARTER GENERATOR SYSTEMS DURING A FAULT CONDITION

(71) Applicant: Texas Instruments Incorporated, Dallas, TX (US)

(72) Inventors: Shyamsunder Balasubramanian, Plano, TX (US); Michael Edwin Butenhoff, Minnesota City, MN (US); Toshio Yamanaka, Plano, TX (US); Luis Eduardo Ossa, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 253 days.

(21) Appl. No.: 17/368,360

(22) Filed: Jul. 6, 2021

(65) Prior Publication Data

US 2023/0010450 A1 Jan. 12, 2023

(51) Int. Cl.
*F02N 11/04* (2006.01)
*H02M 1/32* (2007.01)
*H02M 1/08* (2006.01)

(52) U.S. Cl.
CPC ............. *H02M 1/322* (2021.05); *H02M 1/08* (2013.01); *F02N 11/04* (2013.01)

(58) Field of Classification Search
CPC ......... F02N 11/04; H02M 1/322; H02M 1/08; H02M 1/32; H02M 7/5387
USPC ............ 123/179.25, 179.28, 198 D; 320/166
See application file for complete search history.

(56) References Cited

FOREIGN PATENT DOCUMENTS

WO    WO 2010026144    *    3/2010    ..........    H02M 3/1584

* cited by examiner

*Primary Examiner* — Hai H Huynh
(74) *Attorney, Agent, or Firm* — Valerie M. Davis; Frank D. Cimino

(57) ABSTRACT

An example apparatus includes a level shifter having a first supply input, a gate driver having a second supply input coupled to the first supply input and adapted to be coupled to a cathode of a diode, the gate driver having an output adapted to be coupled to a control terminal of a switch, and a current source circuit having an input and an output, the input adapted to be coupled to a power supply and the output adapted to be coupled to the first supply input, the second supply input and to a capacitor.

20 Claims, 4 Drawing Sheets

METHODS AND APPARATUS FOR PROTECTING STARTER GENERATOR SYSTEMS DURING A FAULT CONDITION

TECHNICAL FIELD

This description relates generally to starter generator systems, and more particularly to methods and apparatus for protecting starter generator systems during a fault condition.

BACKGROUND

Starter generator systems are implemented by engines, such as vehicle engines, aircraft engines, etc., for driving a load, such as a motor. The starter generator systems include circuitry that can drive the motor to start engines and that can generate and supply constant power to the motor to operate the engine. Additionally, starter generator systems include circuitry that can protect the starter generator system during fault conditions of the motor.

SUMMARY

For methods and apparatus for protecting starter generator systems during a fault condition, an example integrated circuit includes a level shifter having a first supply input. The example integrated circuit includes a gate driver having a second supply input coupled to the first supply input and adapted to be coupled to a cathode of a diode, the gate driver having an output adapted to be coupled to a control terminal of a switch. The example integrated circuit includes a current source circuit having an input and an output, the input adapted to be coupled to a power supply and the output adapted to be coupled to the first supply input, the second supply input and to a capacitor.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
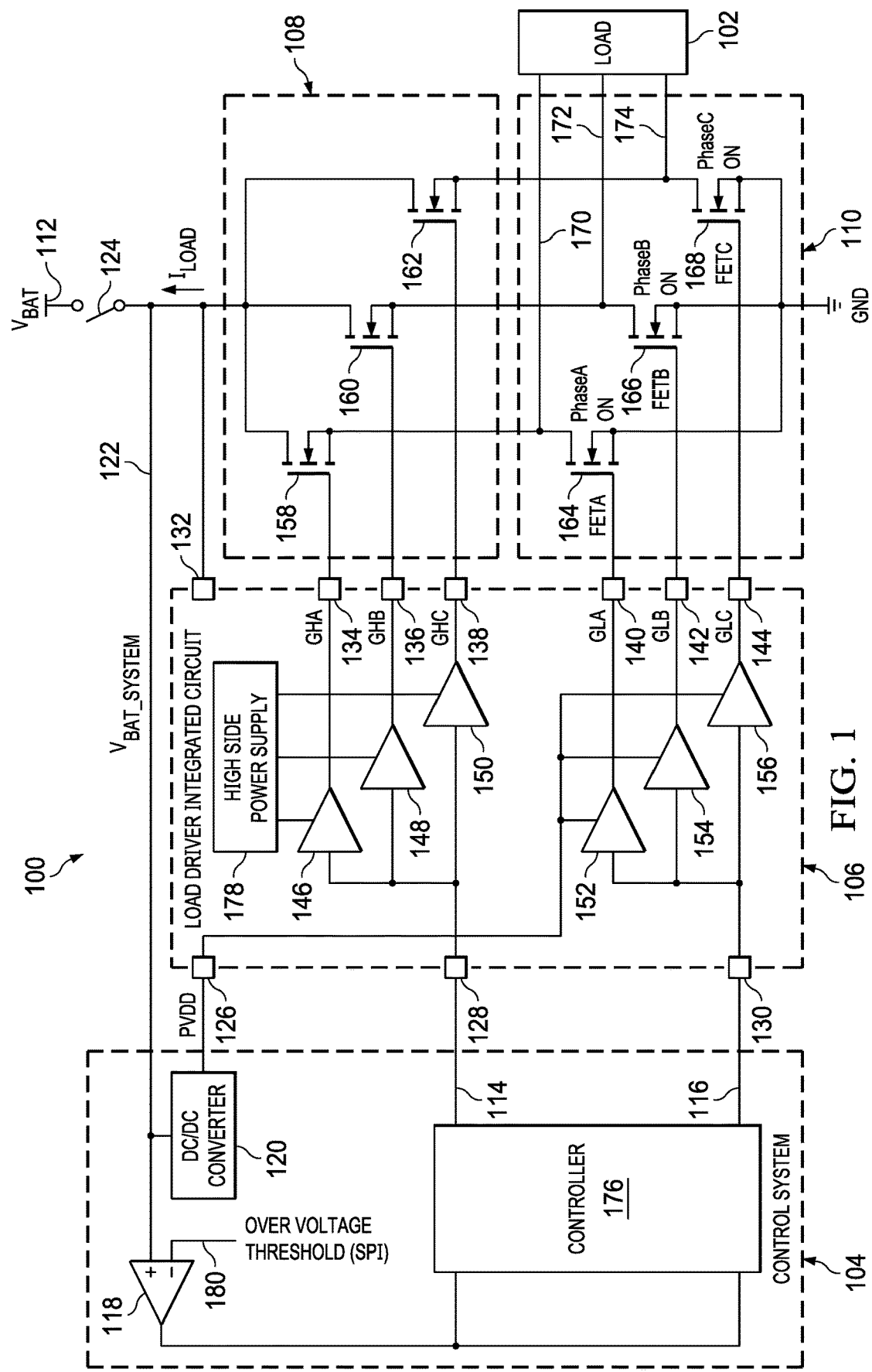
FIG. 1 is a schematic diagram of an example system to operate and/or supply power to an example load.

A high-voltage (e.g. 48 volt) starter-generator system is used to operate and/or supply power to a load, such as a motor. In some examples, the starter-generator system includes a motor driver integrated circuit (IC) that drives a plurality of switches (e.g., external switches, such as metal-oxide-silicon field effect transistors, bipolar junction transistors, transistors, etc.) to supply power to the load. The switches comprise of low-side switches and high-side switches. The high-side switches drive the load (e.g., the motor) during normal operation and the low-side switches short a current from the load to ground in a fault case operation.

In some examples, a fault case operation occurs in the starter-generator system during towing or at a repair shop responsive to wheels of the vehicle system spinning while the vehicle is turned off. In such an example, the rotation of the wheels while the vehicle is off causes the three-phase motor (e.g. the motor used to propel the vehicle in normal operation) to function in a generator mode in which energy is fed from the motor back to the circuit designed to drive the motor. The energy fed back from the motor is called back electromotive force (emf). For bigger motors, the back emf (BEMF) may cause a 48 volt rail of a motor driver IC to exceed 200 volts causing components (e.g., electronic components) in the starter-generator system to fail. The starter-generator system avoids system component failure by turning on the low-side switches to short a motor current to ground. This is called an active short circuit.

A portion of the motor driver IC that initiates active short circuit obtains low-side power from a power supply that derives its power from the overall supply power (e.g., a battery supply 48 volts, 52 volts, etc.). For example, the motor driver IC receives a smaller supply power, relative to the overall supply power, from a DC to DC converter implemented by the starter-generator system, where the DC to DC converter is coupled to the overall power supply and converts 48 volts to 12 volts. In some examples, during a fault condition, this smaller power supply is needed in order to turn on the low side switches. However, the smaller power supply may not be able to turn on during the fault condition. For example, decoupling capacitors provided between the smaller power supply and the motor driver IC can be shorted during the fault condition, the DC to DC converter may be turned off and/or improperly working due to the fault condition, etc. In such an example, the smaller power supply does not provide power to turn on the low side switches, which results in system failure.

Examples disclosed herein resolve the problem of turning on the low side switches during a fault condition. For example, examples disclosed herein facilitate a consistent supply power to the motor driver IC during fault conditions to ensure that the low side switches turn on during the times they are needed. Examples disclosed herein solve this problem by adding a floating low-side power supply for each phase (e.g., each low side switch), allowing tolerance to shorts on the smaller power supply pin as well as on any of the phases. For example, when the smaller power supply is shorted to ground, the floating low-side power supply compensates for the short during a fault condition by supplying the appropriate power to turn on the respective low side switch.

FIG. 1 is a schematic diagram of an example system 100 to operate and/or supply power to an example load 102. The system 100 includes an example control system 104, an example load driver integrated circuit (IC) 106, example high side switches 108, and example low side switches 110. The system 100 is powered by an example system supply ($V_{BAT}$) 112. In this example, load 102 may be an electric motor (such as, a brushless motor or any three-phase motor) and supply 112 is a battery. While in this example, control system 104 and load driver 106 are illustrated as separate integrated circuits (e.g. implemented on different semiconductor substrates), these systems may be implemented on the same semiconductor substrate and/or packaged in the same device package. Furthermore, in some examples, switches 108 and 110 may be fabricated on the same semiconductor substrate and/or the same device package. Systems 104 and 106 may be implemented on the same semiconductor substrate with switches 108 and 110 and/or packaged in the same device package or module. In some examples, system 100 is utilized in an electric vehicle. In other examples, system 100 may be utilized in industrial equipment or any power-generation system where BEMF may damage the system.

In FIG. 1, the control system 104 is configured to generate control signals to provide the load driver IC 106 with information/signals corresponding to which sets of switches (e.g., high side switches 108 and/or low side switches 110) are to be turned on and which are to be turned off. The control system 104 includes an example comparator 118, an example DC to DC converter 120, and an example controller 176.

In FIG. 1, the comparator 118 includes a first comparator input (e.g., a non-inverting input), a second comparator input (e.g., an inverting input), and a comparator output. The first comparator input is coupled to the system supply ($V_{BAT}$) 112 and is configured to receive an example system supply voltage ($V_{BAT\_SYSTEM}$) 122 via an example first switch 124. The second comparator input is coupled to a threshold voltage 180, also referred to as an over voltage threshold 180. The comparator output is coupled to the controller 176 to provide a trigger, notification signal, etc., informing the controller 176 to drive the high side switches 108 or the low side switches 110. The comparator 118 compares the system supply voltage ($V_{BAT\_SYSTEM}$) 122 to the over voltage threshold 180 to determine when the system supply voltage ($V_{BAT\_SYSTEM}$) 122 exceeds a normal operating voltage (e.g., 55 volts, 60 volts, etc.). In some examples, the over voltage threshold 180 may be determined based on operating conditions of the components in the system 100. For example, the over voltage threshold 180 may be defined based on a voltage level that causes the comparator 118, controller 176, load driver IC 106, etc., to fail.

In FIG. 1, the DC to DC converter 120 includes a converter input and a converter output. The converter input is coupled to the system supply ($V_{BAT}$) 112 and is configured to receive the system supply voltage ($V_{BAT\_SYSTEM}$) 122 via the first switch 124. The converter output is coupled to the load driver IC 106 at a first terminal 126. The DC to DC converter 120 may be implemented by a switched-mode power converter that generates a different output voltage than its input voltage. For example, the DC to DC converter 120 obtains a 48 volt input from the system supply 112 and down converts the input to 12 volts at the output. In some examples, the converter supplies (via the converter output) low-side power ($PV_{DD}$) to the load driver IC 106 via the first terminal 126.

In FIG. 1, the controller 176 is a microcontroller. Additionally and/or alternatively, the controller 176 is a microprocessor, a microcomputer, logic circuitry, state machine, application specific integrated circuit (ASIC) and/or any type of embedded computing hardware. The controller 176 is coupled to the comparator output and to the load driver IC 106 to provide control signals. The controller 176 includes a first controller output 114 and a second controller output 116. The first controller output 114 and the second controller output 116 are coupled to the load driver IC 106. In some examples, the controller 176 is to output a "high" (e.g., a logic high, a logic one, a high voltage, etc.) on the first controller output 114 and a "low" (e.g., a logic low, a logic zero, a low/zero voltage, etc.) on the second controller output 116 responsive to the comparator output going low. In some examples, the controller 176 is to output a "low" on the first comparator output 114 and a "high" on the second controller output 116 responsive to the comparator output toggling (e.g., transitioning from low to high).

In FIG. 1, the first switch 124 is implemented by a solid state switch, such as a DC solid state relay, an AC solid state relay, etc. Alternatively, the first switch 124 is implemented by a semiconductor device, such as a metal oxide semiconductor field effect transistor (MOSFET), a bipolar junction transistor (BJT), field-effect transistor (FET), an insulated-gate bipolar transistor (IGBT), a junction field effect transistor (JFET), etc. The first switch 124 may be configured to be coupled to logic control circuitry (not shown) for turning the first switch 124 on and off. For example, logic control circuitry turns the first switch 124 off (e.g., the first switch 124 is open) responsive to the system 100 turning off (e.g., when a vehicle is turned off), and logic control circuitry turns the first switch 124 on (e.g., the first switch 124 is closed) responsive to the system 100 turning on (e.g., when the vehicle is running, operating, turned on, etc.). The first switch 124 is coupled between the system supply ($V_{BAT}$) 112 and blocks of the system 100 (e.g., the control system 104 and the high side switches 108).

In FIG. 1, the system supply ($V_{BAT}$) 112 is implemented by a battery. For example, the system supply ($V_{BAT}$) 112 may be a 48 volt battery. Additionally and/or alternatively, the system supply ($V_{BAT}$) 112 is a voltage source and/or any other type of power supply.

In FIG. 1, the load driver IC 106 is configured to drive the high side switches 108 and the low side switches 110. An IC, such as the load driver IC 106, is one or more electrical circuits that may be coupled to one(s) of each other on the same semiconductor substrate. The load driver IC 106 includes the first terminal 126, an example second terminal 128, an example third terminal 130, an example fourth terminal 132, an example fifth terminal 134, an example sixth terminal 136, an example seventh terminal 138, an example eighth terminal 140, an example ninth terminal 142, and an example tenth terminal 144. The load driver IC 106 includes an example first high side (HS) phase circuit 146, an example second HS phase circuit 148, an example third HS phase circuit 150, an example first low side (LS) phase circuit 152, an example second LS phase circuit 154, an example third LS phase circuit 156, and an example high side power supply 178.

In the load driver IC 106 of FIG. 1, the HS phase circuits 146, 148, 150 are coupled to the first controller output 114 at the second terminal 128 to receive a control signal and are coupled to the high side power supply 178 to receive supply power. The HS phase circuits 146, 148, 150 include circuitry that drives the high side switches 108. For example, the HS phase circuits 146, 148, 150 may include any type of circuitry that activates and/or deactivates the high side switches 108 responsive to reading the control signal on the first controller output 114.

In the load driver IC 106 of FIG. 1, the high side power supply 178 comprises bootstrap circuitry for each of the HS phase circuits 146, 148, 150. In some examples, bootstrap circuitry is designed to provide a positive voltage bias for the HS phase circuits 146, 148, 150. When the HS phase circuits 146, 148, 150 are active (e.g., turned on and driving the high side transistors 158, 160, 162), the reference voltage for the HS phase circuits 146, 148, 150 rises close to a bridge supply voltage (e.g., a difference between supply voltage and a voltage of a bootstrap capacitor). The supply to the HS phase circuits 146, 148, 150 is to then exceed the bridge supply voltage to ensure that the HS phase circuits 146, 148, 150 remain active. This temporary high-side supply is provided by a bootstrap capacitor of the high side power supply 178. In some examples, the high side power supply 178 includes first bootstrap circuitry for the first HS phase circuit 146, second bootstrap circuitry for the second HS phase circuit 148, and third bootstrap circuitry for the third HS phase circuit 150.

In the load driver IC 106 of FIG. 1, the LS phase circuits 152, 154, 156 are coupled to the second controller output 116 at the third terminal 130 to receive a control signal. The LS phase circuits 152, 154, 156 are coupled to the output of the DC to DC converter 120 at the first terminal 126 to obtain low-side power ($PV_{DD}$). The LS phase circuits 152, 154, 156 include circuitry that drives the low side switches 110. For example, the LS phase circuits 152, 154, 156 include any type of circuitry that activates and/or deactivates the low side switches 110 responsive to reading the control signal on the second controller output 116. The LS phase circuits 152, 154, 156 are described in further detail below in connection with FIGS. 2A, 2B, and 3.

In FIG. 1, the high side switches 108 and the low side switch 110 are external switches. For example, the high side and low side switches 108, 110 are external to control system 104 and the load driver IC 106. The high side switches 108 include an example first HS transistor 158, an example second HS transistor 160, and an example third HS transistor 162. The first HS transistor 158, the second HS transistor 160, and the third HS transistor 162 are N-channel MOSFETs (nMOSFETs). Alternatively, the first HS transistor 158, the second HS transistor 160, and the third HS transistor 162 may be N-channel field-effect transistors (FETs), N-channel insulated-gate bipolar transistors (IGBTs), N-channel junction field effect transistors (JFETs), or NPN bipolar junction transistor (BJTs).

In FIG. 1, the low side switches 110 include an example first LS transistor (FETA) 164, an example second LS transistor (FETB) 166, and an example third LS transistor (FETC) 168. The first LS transistor (FETA) 164, the second LS transistor (FETB) 166, and the third LS transistor (FETC) 168 are N-channel MOSFETs. Alternatively, the first LS transistor (FETA) 164, the second LS transistor (FETB) 166, and the third LS transistor (FETC) may be FETs, IGBTs, JFETs, or NPN BJTs.

A gate (e.g., a control terminal, a base terminal, etc.) of the first HS transistor 158 is coupled to an output of the first HS phase circuit 146 at the fifth terminal 134. A drain (e.g., current terminal, collector terminal, etc.) of the first HS transistor 158 is coupled to the first switch 124. A source (e.g., current terminal, emitter terminal, etc.) of the first HS transistor 158 is coupled to a drain of the first LS transistor 164. A gate of the second HS transistor 160 is coupled to an output of the second HS phase circuit 148 at the fifth terminal 134. A drain of the second HS transistor 160 is coupled to the first switch 124. A source of the second HS transistor 160 is coupled to a drain of the second LS transistor 166. A gate of the third HS transistor 162 is coupled to an output of the third HS phase circuit 150 at the seventh terminal 138. A drain of the third HS transistor 162 is coupled to the first switch 124. A source of the third HS transistor 162 is coupled to a drain of the third LS transistor 168.

A gate of the first LS transistor 164 is coupled to an output of the first LS phase circuit 152 at the eighth terminal 140. A source of the first LS transistor 164 is coupled to a common potential (e.g. ground). A gate of the second LS transistor 166 is coupled to an output of the second LS phase circuit 154 at the ninth terminal 142. A source of the second LS transistor 166 is coupled to a common potential (e.g. ground). A gate of the third LS transistor 168 is coupled to an output of the third LS phase circuit 156 at the tenth terminal 144. A source of the third LS transistor 168 is coupled to a common potential (e.g. ground).

In the example of FIG. 1, the terminals 126, 128, 130, 132, 134, 136, 138, 140, 142, 144 can be constructed and/or otherwise be composed of aluminum, copper, etc., or any other conductive material or combination thereof. In the example of FIG. 1, the terminals 126, 128, 130, 132, 134, 136, 138, 140, 142, 144 are pins (e.g., IC pins). Alternatively, the terminals 126, 128, 130, 132, 134, 136, 138, 140, 142, 144 may be legs (e.g., conductive legs), leads (e.g., conductive leads), lugs (e.g., conductive lugs), or any other type of electrical contact. In some examples, terminals 126, 128, 130, 132, 134, 136, 138, 140, 142, 144 may be any type of conductive interconnect that may interconnect integrated circuits (such as circuits formed on different semiconductor die and/or different device packages) or connect circuits formed on the same semiconductor die.

In FIG. 1, the load 102 is a motor. For example, the load 102 is a three-phase motor that, when turned on and operating, draws power from the system 100. If load 102 is a three-phase motor (as shown in FIG. 1), it includes a first load input 170, a second load input 172, and a third load input 174. The first load input 170 is coupled to the source of the first HS transistor 158 and the drain of the first LS transistor 164. The second load input 172 is coupled to the source of the second HS transistor 160 and the drain of the second LS transistor 166. The third load input 174 is coupled to the source of the third HS transistor 162 and the drain of the third LS transistor 168.

Figure 2A:
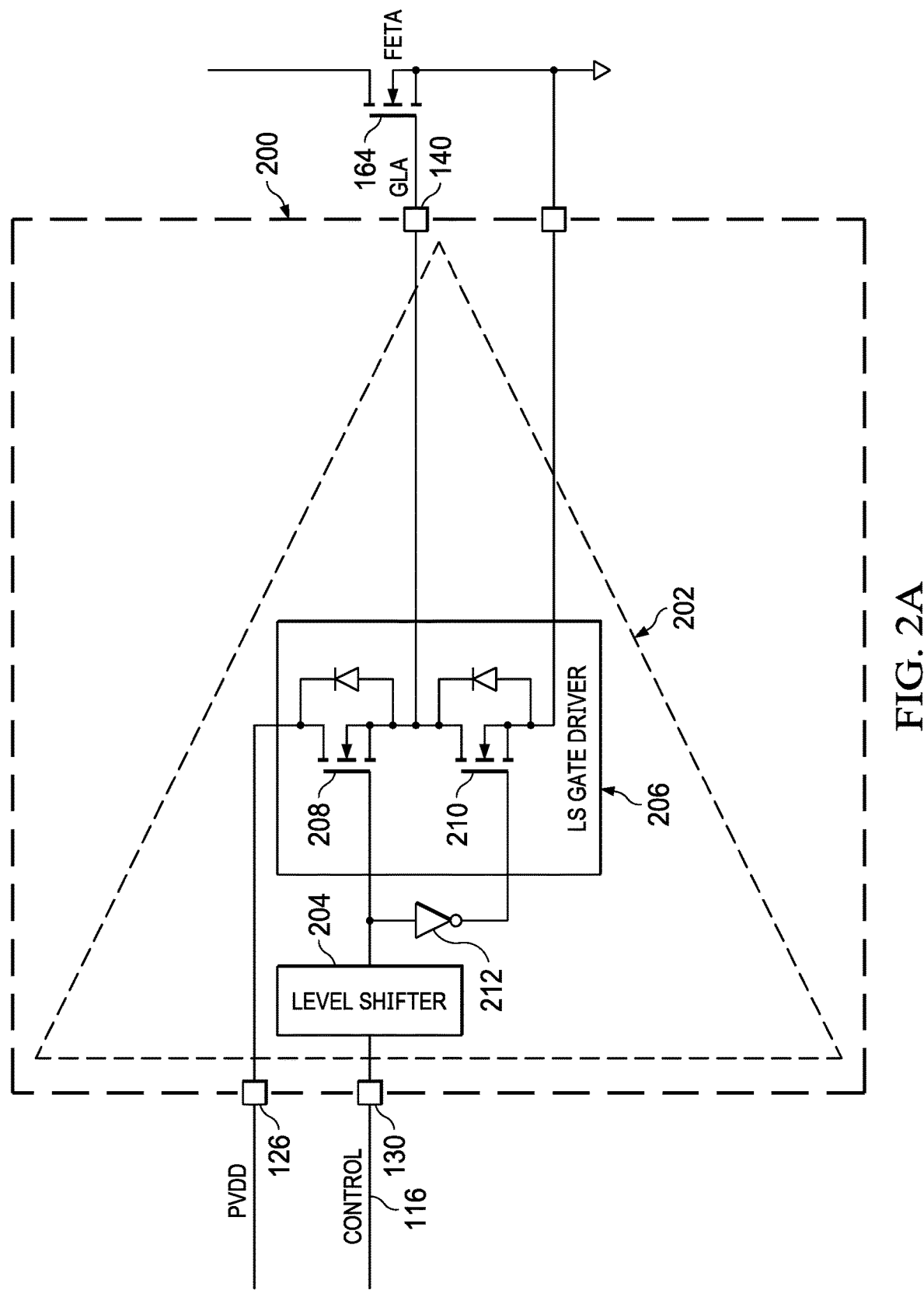
FIG. 2A is a schematic diagram of a first example phase circuit included in a first example load driver integrated circuit (IC) of the example system of FIG. 1 to drive a low side transistor.
Figure 2B:
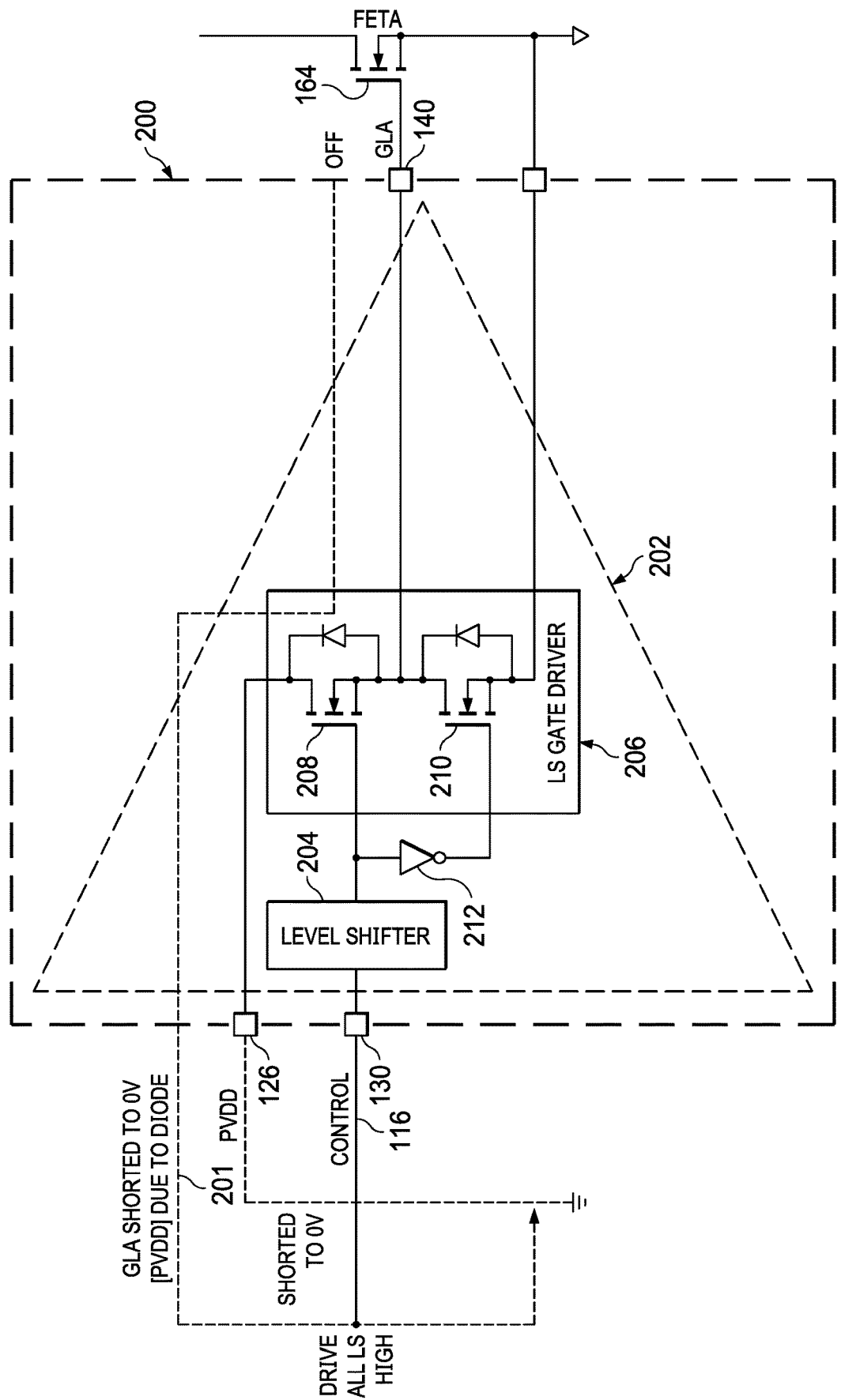
FIG. 2B is an annotated version of the schematic diagram of FIG. 2A to illustrate a signal flow through the first example phase circuit in the first example load driver IC of FIG. 2A during a fault condition.

FIG. 2A is a schematic diagram of a first example LS phase circuit 202 included in a first example load driver integrated circuit (IC) 200 to drive a low-side transistor (e.g., the first LS transistor 164). FIG. 2B is an annotated version of the schematic diagram of FIG. 2A to illustrate a signal flow through the first example LS phase circuit 200 in the first example load driver IC 200 when a fault condition occurs in the system 100. The schematic diagrams of FIGS. 2A and 2B may be used to implement a portion of the load driver IC 106 of FIG. 1. For example, the first example LS phase circuit 202 of FIG. 2A may be used to implement the first LS phase circuit 152 of FIG. 1. The first example LS phase circuit 202 includes an example level shifter 204 and an example LS gate driver 206. The LS gate driver 206 comprises a pull-up transistor 208, a pull-down transistor 210, and a logic gate 212.

In FIG. 2A, the level shifter 204 is circuitry used to translate the signal on the second controller output 116 from one logic level or voltage domain to a different logic level or voltage domain, facilitating a compatibility between the control system 104 and the first example LS phase circuit 202. The level shifter 204 may be a logic level shifter, a voltage level shifter, and/or any type of level shifter for facilitating the compatibility between the control system 104 and the first example LS phase circuit 202. The level shifter 204 includes a level shifter input, a level shifter supply input, and a level shifter output. The input of the level shifter 204 (e.g., the level shifter input) is coupled to the second controller output 116 of FIG. 1 at the third terminal 130, and the supply input of the level shifter 204 (e.g., level shifter supply input) is coupled to the DC to DC converter 120 of FIG. 1 at the first terminal 126. An output of the level shifter 204 (e.g., the level shifter output) is coupled to an input of the LS gate driver 206.

In FIG. 2A, the LS gate driver 206 controls the voltage at the eighth terminal 140 to turn on and turn off the first LS transistor 164. The LS gate driver 206 uses a supply voltage (e.g., from low-side power $P_{VDD}$) in a particular voltage range (e.g., 8 volts-17 volts). The LS gate driver 206 includes the pull-up transistor 208 to pull the voltage at the gate of the first LS transistor 164 high and includes the pull-down transistor 210 to pull the voltage at the gate of the first LS transistor 164 low. The LS gate driver 206 includes the logic gate 212 to invert an output of the level shifter 204 to provide a different gate voltage to the pull-down transistor 210 than the gate voltage of the pull-up transistor 208.

The pull-up transistor 208 and the pull-down transistor 210 are N-channel MOSFETs. Alternatively, the pull-up transistor 208 and the pull-down transistor 210 may be N-channel FETs, N-channel IGBTs, N-channel JFETs, or NPN BJTs. A gate (e.g., a control terminal, a base terminal, etc.) of the pull-up transistor 208 is coupled to an output of the level shifter 204. A drain (e.g., a collector terminal, a current terminal, etc.) of the pull-up transistor 208 is coupled to the low-side power ($P_{VDD}$) at the first terminal 126. A source (e.g., emitter terminal, current terminal, etc.) of the pull-up transistor 208 is coupled to a drain of the pull-down transistor 210 and to the gate of the first LS transistor 164 via the eighth terminal 140. A gate of the pull-down transistor 210 is coupled to an output of the logic gate 212. The drain of the pull-down transistor 210 is coupled to the source of the pull-up transistor 208 and to the gate of the first LS transistor 164 via the eighth terminal 140. A source of the pull-down transistor 210 is coupled to ground.

The pull-up transistor 208 and the pull-down transistor 210 include inherent body diodes. For example, the body diode is intrinsic to the structure of a MOSFET. It is parasitic in nature and is coupled between the drain and source of MOSFETs. A cathode of a first body diode is coupled to the drain of the pull-up transistor 208 and an anode of the first body diode is coupled to the source of the pull-up transistor 208. A cathode of a second body diode is coupled to the drain of the pull-down transistor 210 and an anode of the second body diode is coupled to the source of the pull-down transistor 210.

The logic gate 212 is an inverter, an inverter logic gate, etc. Additionally and/or alternatively, the logic gate 212 is a logic AND gate, a logic OR gate, and/or any type of logic gate by coupling the logic gate in a manner that inverts the output of the level shifter 204.

In normal operation of the first example LS phase circuit 202 of FIG. 2A, a voltage potential at the third terminal 130 goes high responsive to the second controller output 116 going high. For example, the comparator 118 toggles and the controller 176 instructs the load driver IC 200 to turn on the first LS transistor 164. A voltage potential at the first terminal 126 meets a supply voltage range to apply power to the first example LS phase circuit 202 responsive to an output of the DC to DC converter 120 (FIG. 1). The level shifter 204 and the LS gate driver 206 are supplied with low-side power ($P_{VDD}$) and operate as designed. For example, the level shifter 204 obtains the voltage potential at the third terminal 130 and adjusts the output voltage to a level that turns on the pull-up transistor 208 and turns off the pull-down transistor 208. Eventually, the pull-up transistor 208 fully turns on resulting in a low impedance path between the source/drain of pull-up transistor 208 (essentially, shorts to the low-side power ($P_{VDD}$) at the first terminal 126) and the voltage potential at the eighth terminal 140 is high (e.g., high enough to turn on the first LS transistor 164). The pull-down transistor 210 is turned off and all the current at the drain of the pull-down transistor 210 is provided at the eighth terminal 140.

In normal operation of the first example LS phase circuit 202, the voltage potential at the third terminal 130 goes low responsive to the second controller output 116 going low. For example, the comparator 118 toggles from the high state to the low state (e.g., the system supply voltage 122 falls below the over voltage threshold 180) and instructs the load driver IC 200 to turn off the first LS transistor 164. The level shifter 204 turns off the pull-up transistor 208 and turns on the pull-down transistor 210 to bring the voltage potential at the eighth terminal 140 to ground. For example, the current at the drain of the pull-down transistor 210 sinks to ground and the voltage at the eighth terminal 140 goes low. The first LS transistor 164 turns off as the potential at the eighth terminal 140 is pulled to ground.

The following description references the system 100 of FIG. 1 and the circuitry illustrated in FIGS. 2A and 2B. In an example fault operation of the system 100, the high side switches 108 and the HS phase circuits 146, 148, 150 are turned off and no current is flowing to the load 102. The load 102, however, is unintentionally running (e.g., tires are being spun at a repair shop and/or while being towed). The first, second, and third load inputs 170, 172, and 174, then, act as outputs and the back emf of the load 102 is injected into the high side transistors 158, 160, 162 (high side switches 108). For example, the load 102 acts as a generator, generating back emf responsive to the system 100. Since system 100 is off, first switch 124 is open. In this fault condition, the load 102 tries to push a load current ($I_{LOAD}$) (caused by the back emf) back through the system 100 via body diodes of the HS transistors 158, 160, 162. The control system 104 detects the fault condition of the load 102 and generates a high on the second controller output 116 indicative to turn on the low side switches 110. For example, the comparator 118 toggles from low to high responsive to the supply system voltage 122 exceeding the over voltage threshold 180 and the controller 176 outputs a value to third terminal 130 that informs the LS phase circuits 152, 154, 156 to turn on the LS transistors 164, 166, 168. The control system 104 initiates the LS transistors 164, 166, 168 in order to sink the load current $I_{LOAD}$ to ground. In this manner, the load current ($I_{LOAD}$) cannot damage the system 100.

However, an issue can arise during this fault operation when turning on the LS transistors 164, 166, 168. The problem is, to turn on the LS transistors 164, 166, 168, the low-side power ($P_{VDD}$) is needed to initiate the LS phase circuits 152, 154, 156 and, in some examples, there is no low-side power at the first terminal 126. For example, there is a capacitor (not shown) coupled in parallel to the output of the DC to DC converter 120 and to the first terminal 126. The capacitor may act as a decoupling capacitor to remove noise, generated by the control system 104, from the low-side power ($P_{VDD}$). In some examples, the capacitor (not shown) can be shorted to ground during the fault condition due to normal component failure/wear out over time. If back emf is not controlled by turning on the LS transistors 164, 166, 168 and the voltage (e.g., $V_{BAT\_SYSTEM}$ 122) rises too high, the decoupling capacitor could short. In such an example, a voltage potential at the first terminal 126 is approximately zero, and the LS phase circuits 152, 154, 156 are not provided with power to operate. Other examples could occur during the fault operation that causes the voltage potential at the first terminal 126 to be approximately zero and/or below an operating voltage of the LS phase circuits 152, 154, 156. When the LS phase circuits 152, 154, 156 are not provided with low-side power ($P_{VDD}$), the LS switches 110 do not turn on and the load current ($I_{LOAD}$) continues to bring up the value of the system supply voltage ($V_{BAT\_SYSTEM}$) 122 until the system components fail (e.g., overheat, burn, shut down, etc.).

The first example load driver IC 200 is not optimally configured to compensate for the low-side power ($P_{VDD}$) during this type of fault operation. For example, the first example load driver IC 200 is not optimally configured to power the LS phase circuits 152, 154, 156 when $P_{VDD}$ is shorted to ground. For example, turning to FIG. 2B, when the first terminal 126 is shorted to ground and the voltage potential is zero volts, there is no way to pull the voltage potential at the eighth terminal 140 up due to the first body diode of the pull-up transistor 208. For example, if the eighth terminal 140 is at a higher voltage level than the first terminal 126, the first body diode of the pull-up transistor 208 conducts current in a forward bias condition, and the current flowing through the first body diode from the eighth terminal 140 to the first terminal 126 cannot be cut off independent of gate of pull-up transistor 208. For example, a signal path 201 is depicted in FIG. 2B to illustrate a direction in which current flows through the first example LS phase circuit 202. In FIG. 2B, when the first terminal 126 is shorted to ground, the body diode will also short to ground and, thus, the voltage potential at the eighth terminal 140 never meets a level that is enough to turn on the first LS transistor 164. Examples disclosed herein solve the problem illustrated in FIG. 2B to turn on the LS switches 110 even when the potential at the first terminal 126 is shorted to ground.

Figure 3:
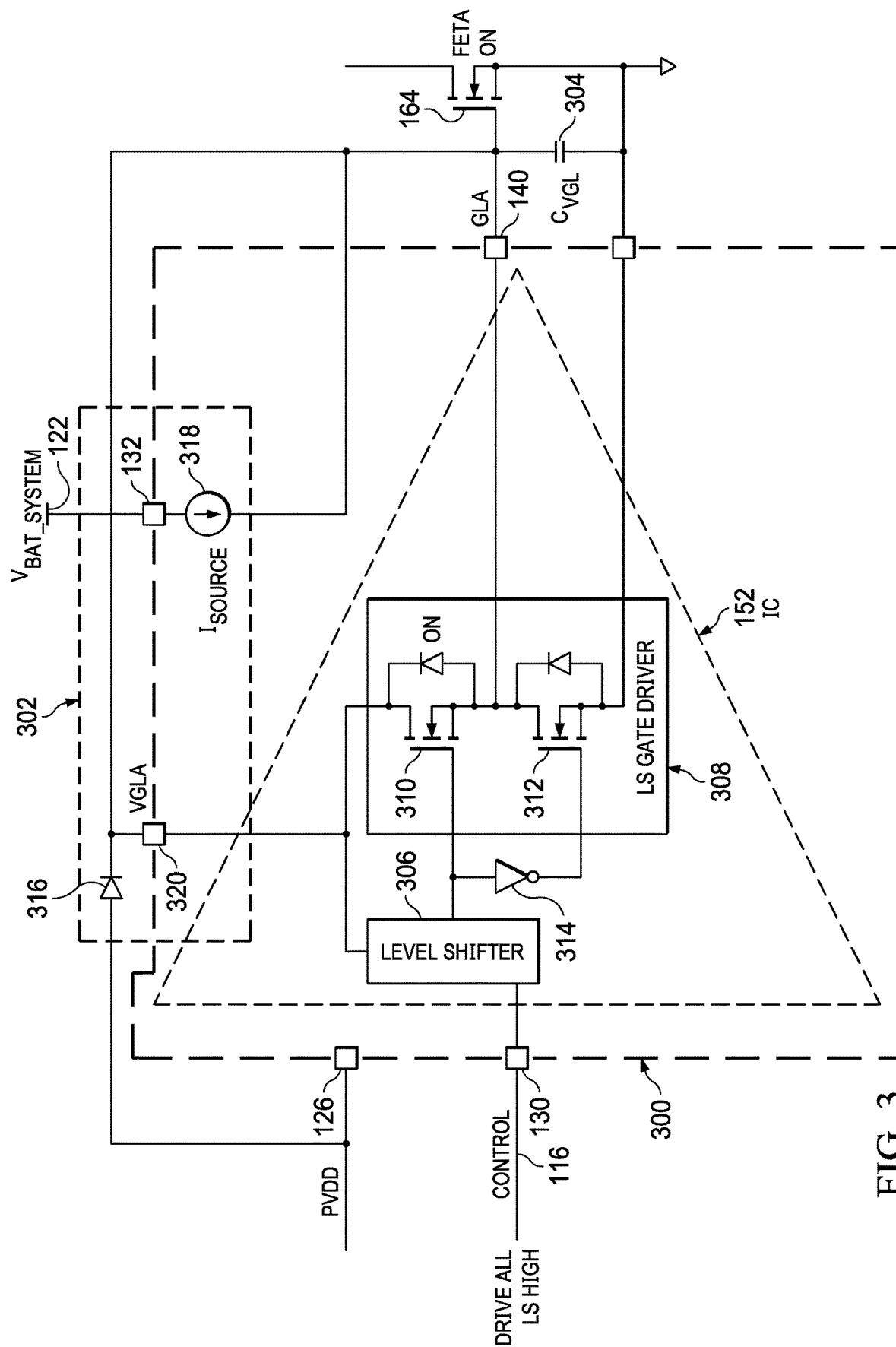
FIG. 3 is a schematic diagram of a second example load driver IC including low side supply compensation circuitry to drive the low side transistor of FIG. 1 during fault conditions.

FIG. 3 is a schematic diagram of a second example load driver IC 300 including low side supply compensation circuitry 302 to drive the low side transistor 164 of FIG. 1. In this example, the second example load driver IC 300 replaces the first example load driver IC 200 of FIGS. 2A and 2B. In some examples, the second example load driver IC 300 can implement the load driver IC 106 of FIG. 1. The second example load driver IC 300 illustrates an implementation of only one low side phase circuit. However, the second example load driver IC 300 can implement a plurality of low side phase circuits to drive a plurality of low side switches. In this example, the second example load driver IC 300 includes the first LS phase circuit 152 of FIG. 1. Additionally and/or alternatively, the second example load driver IC 300 can include the second LS phase circuit 154, the third LS phase circuit 156, or any other phase circuit in the second example load driver IC 106. In an alternative example, the second example load driver IC 300 can be used in place of first LS phase circuit 152 of FIG. 1; a second load driver IC 300 can be used in place of second LS phase circuit 154 of FIG. 1; and a third load driver IC 300 can be used in place of third LS phase circuit 156 of FIG. 1. The second example load driver IC 300 includes example low side supply compensation circuitry 302, an example capacitor ($C_{VGL}$) 304 (which may be internal to or external to the second example load driver IC 300), and the first LS phase circuit 152 of FIG. 1. The first LS phase circuit 152 includes an example level shifter 306 and an example LS gate driver 308. The LS gate driver 308 includes an example pull-up transistor 310, an example pull-down transistor 312, and an example logic gate 314. The low side supply compensation circuitry 302 includes an example diode 316 and an example current source circuit 318.

In FIG. 3, the low side (LS) supply compensation circuitry 302 compensates low side power supplied to the LS phase circuits responsive to the voltage potential at the first terminal 126 being low, shorted to ground, etc. In some examples, LS supply compensation circuitry 302 is replicated, duplicated, copied, etc., and provided for each low side phase (e.g., each LS phase circuit 152, 154, 156) of the second example load driver IC 300 and/or the load driver IC 106. In some examples, the LS supply compensation circuitry 302 is to function as a floating low side power supply for the low side phases in the second example load driver IC 300 and/or the load driver IC 106.

In FIG. 3, the level shifter 306 is circuitry used to translate the signal on the second controller output 116 from one logic level or voltage domain to a different logic level or voltage domain, facilitating a compatibility between the control system 104 and the first LS phase circuit 152. The level shifter 306 may be a logic level shifter, a voltage level shifter, and/or any type of level shifter for facilitating the compatibility between the control system 104 and the first LS phase circuit 152. The level shifter 306 includes a level shifter input, a level shifter supply input, and a level shifter output. The input of the level shifter 306 (e.g., the level shifter input) is coupled to the second controller output 116 of FIG. 1 at the third terminal 130 and the supply input of the level shifter 306 (e.g., level shifter supply input) is coupled to the LS supply compensation circuitry 302 at a first phase terminal (VGLA) 320. An output of the level shifter 306 (e.g., the level shifter output) is coupled to an input of the LS gate driver 308.

In FIG. 3, the LS gate driver 308 controls the voltage at the eighth terminal 140 to turn on and turn off the first LS transistor 164 (FETA or field effect transistor-A). The LS gate driver 308 utilizes a supply voltage (e.g., from low-side power $P_{VDD}$ and/or from the supply compensation circuitry 302) in a particular voltage range (e.g., 8 volts-17 volts). The LS gate driver 308 includes the pull-up transistor 310 to pull the voltage at the gate of the first LS transistor 164 high and includes the pull-down transistor 312 to pull the voltage at the gate of the first LS transistor 164 low. The LS gate driver 308 includes the logic gate 314 to invert an output of the level shifter 306 to provide a different gate voltage to the pull-down transistor 312 than the gate voltage of the pull-up transistor 310.

The pull-up transistor 310 and the pull-down transistor 312 are nMOSFETs. Alternatively, the pull-up transistor 310 and the pull-down transistor 312 may be N-channel FETs, N-channel IGBTs, N-channel JFETs, or NPN BJTs. A gate (e.g., a control terminal, a base terminal, etc.) of the pull-up transistor 310 is coupled to an output of the level shifter 306. A drain (e.g., a collector terminal, a current terminal, etc.) of the pull-up transistor 310 is coupled to the diode 316 at the first phase terminal (VGLA) 320. A source (e.g., emitter terminal, current terminal, etc.) of the pull-up transistor 310 is coupled to a drain of the pull-down transistor 312 and to the gate of the first LS transistor 164 via the eighth terminal 140. A gate of the pull-down transistor 312 is coupled to an output of the logic gate 312. The drain of the pull-down transistor 312 is coupled to the source of the pull-up transistor 310 and to the gate of the first LS transistor 164 via the eighth terminal 140. A source of the pull-down transistor 312 is coupled to ground.

The pull-up transistor 310 and the pull-down transistor 312 include inherent body diodes. For example, the body diode is intrinsic to the structure of a MOSFET. It is parasitic in nature and is coupled between the drain and source of MOSFETs. A cathode of a first body diode is coupled to the drain of the pull-up transistor 310 and an anode of the first body diode is coupled to the source of the pull-up transistor 310. A cathode of a second body diode is coupled to the drain of the pull-down transistor 312 and an anode of the second body diode is coupled to the source of the pull-down transistor 312.

The logic gate 314 is an inverter, an inverter logic gate, etc. Additionally and/or alternatively, the logic gate 314 is a logic AND gate, a logic OR gate, and/or any type of logic gate by coupling the logic gate in a manner that inverts the output of the level shifter 306.

The diode 316 is a blocking diode. Alternatively, the diode 316 may be any type of diode that allows current to flow in only one direction. An anode of the diode 316 is coupled to the output of the DC to DC converter 120 of FIG. 1. A cathode of the diode 316 is coupled to a positive terminal of the external capacitor 304 and to the second example load driver IC 300 at a first phase terminal (VGLA) 320. The level shifter 306 and the drain of the pull-up transistor 310 are coupled to the first phase terminal 320 and, thus, are coupled to the cathode of the diode 316. In some examples, the second example load driver IC 300 includes a phase terminal for each LS phase in the second example load driver IC 300. For example, the second example load driver IC 300 may include a second phase terminal (VGLB) for the second LS phase circuit 154 and a third phase terminal (VGLC) for the third LS phase circuit 156. In such an example, the second phase terminal (VGLB) may be coupled to a second diode, different than the (first) diode 316, and the third phase terminal (VGLC) may be coupled to a third diode, different than the (first) diode 316 and the second diode. In some examples, the diode 316 may be included and/or implemented by the second example load driver IC 300 and, thus, directly coupled to the level shifter 306 and the drain of the pull-up transistor 310.

The current source circuit 318 is to derive and/or source current from the system supply voltage ($V_{BAT\_SYSTEM}$) 122. In some examples, the current source circuit 318 is to draw a small amount of current from the system supply voltage 122. An input of the current source circuit 318 (e.g., current source input) is coupled to the first switch 124 of FIG. 1 at the fourth terminal 132. An output of the current source circuit 318 (e.g., current source output) is coupled to the positive terminal of the external capacitor 304 and to the cathode of the diode 316. The current source circuit 318 is included in and/or implemented by the second example load driver IC 300. Additionally and/or alternatively, the current source circuit 318 may be external of the second example load driver IC 300. In some examples, each phase of the LS phase circuits 152, 154, 156 in the load driver IC 106 include a current source circuit. Additionally and/or alternatively, each phase of the LS phase circuits 152, 154, 156 share the current source circuit 318.

In an example first fault operation of the second example load driver IC 300, the controller 176 outputs a high at the second controller output 116 to initiate the level shifter 306, via the third terminal 130, to turn on the first LS transistor 164. There is a voltage potential at the first phase terminal (VGLA) 320 responsive to the high signal on the second controller output 116. Under this first fault condition, the low side power ($P_{VDD}$) of the DC to DC converter 120 output is shorted to ground via a malfunctioning decoupling capacitor (not shown). In the first example load driver IC 200, the potential at the eighth terminal 140 would short to ground when the potential at the first terminal 126 shorts to ground due to the body diode of the pull-up transistor 310. However, the diode 316 of the second example load driver IC 300 advantageously blocks any flow of current from cathode to anode and, thus, the voltage potential at the eighth terminal 140 and at the first phase terminal 320 does not short to ground.

In the example first fault operation, the system supply voltage 122 increases as the load 102 outputs power back into the system 100 (e.g., back emf). As the system supply voltage 122 increases, the current source circuit 318 is to sink a small amount of current and charge the external capacitor 304. The external capacitor 304 is to store the charge/current from the current source circuit 318 over time (e.g., a couple milliseconds, 1 second, etc.) that, eventually, stores enough charge to drive the gate voltage of the first LS transistor 164 on. The voltage at the first phase terminal 320 increases responsive to the charge of the external capacitor 304, because the first phase terminal 320 is coupled to the external capacitor 304. The diode 316 prevents the charge at the first phase terminal 320 from flowing back through the diode 316 to ground and, thus, the level shifter 306 (and the pull-up transistor 310) is supplied with adequate power to turn on the first LS transistor 164.

In an example second fault operation of the second example load driver IC 300, the control signal at the second controller output 116 initiates the level shifter 306 via the third terminal 130 to turn on the first LS transistor 164. The low side power ($P_{VDD}$) of the DC to DC converter 120 output is shorted to ground via a malfunctioning decoupling capacitor (not shown). There is no voltage potential at the first phase terminal (VGLA) 320 due to the diode 316 not operating correctly, the potential being shorted to ground by the pull-down transistor 312, the capacitor 304 may be shorted, etc. The first LS transistor 164 does not turn on responsive to the short of the diode 316 and/or the short on the capacitor 304. However, because the low side (LS) supply compensation circuitry 302 is duplicated for each phase, at least one or both of the second LS phase circuit 154 and/or the third LS phase circuit 156 turn on the second and/or third LS transistors 166, 168 responsive to respective LS compensation circuitry charging the respective phase terminal(s) via the respective current source circuits. In such an example, when at least one or more of the LS transistors 164, 166, 168 is/are turned on, the system 100 is adequately protected from the back emf of the load 102. For example, at least one or more of the LS transistors 164, 166, 168 can break the load 102 to protect the system 100.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

Example methods, apparatus and articles of manufacture described herein improve starter-generator systems when fault conditions occur by allowing tolerance to shorts on the low-side circuitry of the starter-generator system's load driver IC. The load driver IC implements low-side supply compensation circuitry that ensures adequate power is always provided to the low-side driving components that are to drive the low side switches on for protecting the starter-generator system during the fault condition. Examples disclosed herein include diodes to block the terminals, that are coupled to the gates of the low side switches, from shorting to ground. Examples disclosed herein include a current source and a capacitor to draw current from the increasing supply voltage during the fault condition and charge the terminals that are coupled to the low-side driving components.

Example methods, apparatus, systems, and articles of manufacture for protecting starter generator systems during a fault condition are disclosed herein. Further examples and combinations thereof include the following:

Example 1 includes an integrated circuit comprising a level shifter having a first supply input, a gate driver having a second supply input coupled to the first supply input and adapted to be coupled to a cathode of a diode, the gate driver having an output adapted to be coupled to a control terminal of a switch, and a current source circuit having an input and an output, the input adapted to be coupled to a power supply and the output adapted to be coupled to the first supply input, the second supply input and to a capacitor.

Example 2 includes the integrated circuit of example 1, wherein the integrated circuit comprises a first terminal adapted to be coupled to an anode of the diode and to a DC to DC converter to receive a low side power supply.

Example 3 includes the integrated circuit of example 1, wherein the gate driver includes a first transistor having a first drain, a first source, and a first gate, the first drain adapted to be coupled to the cathode of the diode and the first gate coupled to an output of the level shifter, a second transistor having second drain, a second source, and a second gate, the second drain coupled to the first source and the second gate coupled to the output of the level shifter, and the integrated circuit comprises a first terminal adapted to be coupled to the capacitor.

Example 4 includes the integrated circuit of example 1, wherein the integrated circuit comprises a control input coupled to an input of the level shifter and adapted to be coupled to a controller output to receive a control signal.

Example 5 includes the integrated circuit of example 1, wherein the integrated circuit comprises a first terminal adapted to be coupled to a gate of a low side transistor.

Example 6 includes the integrated circuit of example 5, wherein the gate driver includes a first transistor having a first drain, a first source, and a first gate, the first drain adapted to be coupled to the cathode of the diode, the first source coupled to the first terminal, and the first gate coupled to an output of the level shifter, and a second transistor having second drain, a second source, and a second gate, the second drain coupled to the first source and to the first terminal, and the second gate coupled to the output of the level shifter.

Example 7 includes an apparatus comprising an integrated circuit including a phase circuit having a supply input, and a current source circuit having a current source output, the current source output coupled to the supply input, a diode having an anode and a cathode, the anode configured to be coupled to a DC to DC converter and the cathode coupled to supply input, and a capacitor coupled to the current source output and to the supply input.

Example 8 includes the apparatus of example 7, wherein the integrated circuit includes a first terminal coupled between the supply input and the cathode of the diode, a second terminal coupled to an input of the current source circuit and configured to be coupled to a switch, a third terminal coupled between an output of the phase circuit and a low side transistor, and a fourth terminal coupled to an input of the phase circuit and configured to be coupled to a controller output to receive a control signal.

Example 9 includes the apparatus of example 7, wherein the phase circuit includes a level shifter having a level shifter supply input and a level shifter output, the level shifter supply input is the supply input and is configured to be coupled to the cathode of the diode, and a gate driver having a gate driver input, a gate driver supply input, and a gate driver output, the gate driver supply input is the supply input and is configured to be coupled to the cathode of the diode, the gate driver input is coupled to the level shifter output.

Example 10 includes the apparatus of example 9, wherein the gate driver includes a first transistor having a first drain, a first source, and a first gate, the first drain coupled to the cathode of the diode and the first gate coupled to the level shifter output, and a second transistor having second drain, a second source, and a second gate, the second drain coupled to the first source and the second gate coupled to the level shifter output.

Example 11 includes the apparatus of example 7, wherein the integrated circuit includes a first transistor having a first drain, a first source, and a first gate, the first drain is the supply input, a first terminal coupled to the first drain between and the cathode, a second transistor having a second drain and a second gate, the second drain is coupled to the first source, a second terminal coupled to the second drain and the first source and configured to be coupled to a low side transistor, a third terminal coupled to an input of the current source circuit and configured to be coupled to a switch, a level shifter having a level shifter input, a level shifter supply input, and a level shifter output, the level shifter supply input coupled to the first terminal and the level shifter output is coupled to the first gate and the second gate, and a fourth terminal coupled to the level shifter input and configured to be coupled to a controller output to receive a control signal.

Example 12 includes the apparatus of example 7, wherein the diode is a blocking diode.

Example 13 includes the apparatus of example 7, wherein the integrated circuit includes the diode.

Example 14 includes the apparatus of example 7, wherein the integrated circuit includes the capacitor.

Example 15 includes a system comprising a control system including a DC to DC converter, a load driver coupled to the DC to DC converter, the load driver including at least one phase circuit, and low side supply compensation circuitry coupled between the DC to DC converter and the at least one phase circuit, and a transistor having a gate and a drain, the gate coupled to an output of the at least one phase circuit and the drain adapted to be coupled to a load.

Example 16 includes the system of example 15, wherein the system comprises a switch, the switch is coupled to an input of the DC to DC converter and adapted to be coupled to a battery.

Example 17 includes the system of example 15, wherein the control system includes a comparator having a first comparator input, a second comparator input, and a comparator output, the first comparator input is adapted to be coupled to a switch, the second comparator input is coupled to a threshold voltage, and the comparator output is coupled to a controller.

Example 18 includes the system of example 15, wherein the low side supply compensation circuitry includes a diode having an anode and a cathode, the anode coupled to an output of the DC to DC converter and the cathode coupled to the at least one phase circuit, and a current source circuit having a current source input and current source output, the current source input is adapted to be coupled to a switch and the current source output is coupled to the cathode and the at least one phase circuit.

Example 19 includes the system of example 15, wherein the low side supply compensation circuitry is replicated for each phase circuit.

Example 20 includes the system of example 15, wherein the system comprises a capacitor coupled to the low side supply compensation circuitry.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead. For example, a p-type MOSFET may be used in place of an n MOSFET with little or no changes to the circuit. Furthermore, other types of transistors may be used (such as bipolar junction transistors (BJTs)).

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value.

Modifications are possible in the described embodiments, and other embodiments are possible, within the scope of the claims.

What is claimed is:

1. An integrated circuit comprising:
   a level shifter having a first supply input;
   a gate driver having a second supply input coupled to the first supply input and adapted to be coupled to a cathode of a diode, the gate driver having an output adapted to be coupled to a control terminal of a switch; and
   a current source circuit having an input and an output, the input adapted to be coupled to a power supply and the output adapted to be coupled to the first supply input, the second supply input and to a capacitor.

2. The integrated circuit of claim 1, wherein the integrated circuit comprises a first terminal adapted to be coupled to an anode of the diode and to a DC to DC converter to receive a low side power supply.

3. The integrated circuit of claim 1, wherein the gate driver includes:
   a first transistor having a first drain, a first source, and a first gate, the first drain adapted to be coupled to the cathode of the diode and the first gate coupled to an output of the level shifter;
   a second transistor having second drain, a second source, and a second gate, the second drain coupled to the first source and the second gate coupled to the output of the level shifter; and
   the integrated circuit comprises a first terminal adapted to be coupled to the capacitor.

4. The integrated circuit of claim 1, wherein the integrated circuit comprises a control input coupled to an input of the level shifter and adapted to be coupled to a controller output to receive a control signal.

5. The integrated circuit of claim 1, wherein the integrated circuit comprises a first terminal adapted to be coupled to a gate of a low side transistor.

6. The integrated circuit of claim 5, wherein the gate driver includes:
   a first transistor having a first drain, a first source, and a first gate, the first drain adapted to be coupled to the cathode of the diode, the first source coupled to the first terminal, and the first gate coupled to an output of the level shifter; and
   a second transistor having second drain, a second source, and a second gate, the second drain coupled to the first source and to the first terminal, and the second gate coupled to the output of the level shifter.

7. An apparatus comprising:
   an integrated circuit including:
      a phase circuit having a supply input; and
      a current source circuit having a current source output, the current source output coupled to the supply input;
   a diode having an anode and a cathode, the anode configured to be coupled to a DC to DC converter and the cathode coupled to supply input; and a capacitor coupled to the current source output and to the supply input.

8. The apparatus of claim 7, wherein the integrated circuit includes:
a first terminal coupled between the supply input and the cathode of the diode;
a second terminal coupled to an input of the current source circuit and configured to be coupled to a switch;
a third terminal coupled between an output of the phase circuit and a low side transistor; and
a fourth terminal coupled to an input of the phase circuit and configured to be coupled to a controller output to receive a control signal.

9. The apparatus of claim 7, wherein the phase circuit includes:
a level shifter having a level shifter supply input and a level shifter output, the level shifter supply input is the supply input and is configured to be coupled to the cathode of the diode; and
a gate driver having a gate driver input, a gate driver supply input, and a gate driver output, the gate driver supply input is the supply input and is configured to be coupled to the cathode of the diode, the gate driver input is coupled to the level shifter output.

10. The apparatus of claim 9, wherein the gate driver includes:
a first transistor having a first drain, a first source, and a first gate, the first drain coupled to the cathode of the diode and the first gate coupled to the level shifter output; and
a second transistor having second drain, a second source, and a second gate, the second drain coupled to the first source and the second gate coupled to the level shifter output.

11. The apparatus of claim 7, wherein the integrated circuit includes:
a first transistor having a first drain, a first source, and a first gate, the first drain is the supply input;
a first terminal coupled to the first drain between and the cathode;
a second transistor having a second drain and a second gate, the second drain is coupled to the first source;
a second terminal coupled to the second drain and the first source and configured to be coupled to a low side transistor;
a third terminal coupled to an input of the current source circuit and configured to be coupled to a switch;
a level shifter having a level shifter input, a level shifter supply input, and a level shifter output, the level shifter supply input coupled to the first terminal and the level shifter output is coupled to the first gate and the second gate; and
a fourth terminal coupled to the level shifter input and configured to be coupled to a controller output to receive a control signal.

12. The apparatus of claim 7, wherein the diode is a blocking diode.

13. The apparatus of claim 7, wherein the integrated circuit includes the diode.

14. The apparatus of claim 7, wherein the integrated circuit includes the capacitor.

15. A system comprising:
a control system including a DC to DC converter;
a load driver coupled to the DC to DC converter, the load driver including:
at least one phase circuit; and
low side supply compensation circuitry coupled between the DC to DC converter and the at least one phase circuit; and
a transistor having a gate and a drain, the gate coupled to an output of the at least one phase circuit and the drain adapted to be coupled to a load.

16. The system of claim 15, wherein the system comprises a switch, the switch is coupled to an input of the DC to DC converter and adapted to be coupled to a battery.

17. The system of claim 15, wherein the control system includes a comparator having a first comparator input, a second comparator input, and a comparator output, the first comparator input is adapted to be coupled to a switch, the second comparator input is coupled to a threshold voltage, and the comparator output is coupled to a controller.

18. The system of claim 15, wherein the low side supply compensation circuitry includes:
a diode having an anode and a cathode, the anode coupled to an output of the DC to DC converter and the cathode coupled to the at least one phase circuit; and
a current source circuit having a current source input and current source output, the current source input is adapted to be coupled to a switch and the current source output is coupled to the cathode and the at least one phase circuit.

19. The system of claim 15, wherein the low side supply compensation circuitry is replicated for each phase circuit.

20. The system of claim 15, wherein the system comprises a capacitor coupled to the low side supply compensation circuitry.

* * * * *